US012443046B1

(12) United States Patent
Olgun et al.

(10) Patent No.: US 12,443,046 B1
(45) Date of Patent: Oct. 14, 2025

(54) RF SHIELDING STRUCTURE FOR EXTENDED REALITY GLASSES

(71) Applicant: Snap Inc., Santa Monica, CA (US)

(72) Inventors: Ugur Olgun, Marina Del Rey, CA (US); Stephen Andrew Steger, Los Angeles, CA (US); Jordan Wakser, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 277 days.

(21) Appl. No.: 18/135,407

(22) Filed: Apr. 17, 2023

(51) Int. Cl.
*G02B 27/01* (2006.01)
*G02C 11/00* (2006.01)

(52) U.S. Cl.
CPC .......... *G02B 27/0176* (2013.01); *G02C 11/10* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 6,271,941 B1 | 8/2001 | Arnold et al. | |
| 7,348,665 B2 | 3/2008 | Sauciuc et al. | |
| 7,397,531 B2 | 7/2008 | Franken | |
| 9,400,390 B2 | 7/2016 | Osterhout et al. | |
| 9,948,044 B2 | 4/2018 | Harris et al. | |
| 11,163,166 B1 | 11/2021 | Ebert | |
| 11,558,711 B2 | 1/2023 | Palos et al. | |
| 11,779,204 B1 | 10/2023 | Aferzon et al. | |
| 11,888,002 B2 | 1/2024 | Berkovich et al. | |
| 12,174,390 B1 * | 12/2024 | Ashwood | G02C 11/10 |
| 12,222,515 B2 | 2/2025 | Ockfen et al. | |
| 12,306,455 B2 | 5/2025 | Girard et al. | |
| 12,342,070 B2 | 6/2025 | Ganguly et al. | |

(Continued)

FOREIGN PATENT DOCUMENTS

| | | |
|---|---|---|
| CN | 207780368 U | 8/2018 |
| CN | 209044446 U | 6/2019 |

(Continued)

OTHER PUBLICATIONS

"U.S. Appl. No. 18/135,400, Examiner Interview Summary mailed Jun. 4, 2024", 2 pgs.

(Continued)

*Primary Examiner* — Kristy A Haupt
(74) *Attorney, Agent, or Firm* — SCHWEGMAN LUNDBERG & WOESSNER, P.A

(57) ABSTRACT

A support arm assembly for a head-worn device provides radio frequency (RF) shielding for a projector. A metal support arm, configured to structurally attach to a rear structural element and an optical element holder of the head-worn device, forms a rear face, a bottom face, and a top face of an enclosure. A metal front face of the enclosure attaches to the optical element holder, and defines a front aperture for permitting passage of light from an exit pupil of the projector toward an input optical element. The metal support arm forms a structural support joining the optical element holder to the rear structural element without placing mechanical load on the projector. A first side face of the enclosure and a second side face of the enclosure are electrically coupled to the metal support arm.

20 Claims, 14 Drawing Sheets

(56) References Cited

U.S. PATENT DOCUMENTS

| | | | |
|---|---|---|---|
| 2014/0168784 A1* | 6/2014 | Hiraki | G02B 27/0176 |
| | | | 359/630 |
| 2014/0340285 A1 | 11/2014 | Hiraide | |
| 2015/0101935 A1 | 4/2015 | Chen | |
| 2015/0302646 A1 | 10/2015 | Osterhout et al. | |
| 2017/0097509 A1 | 4/2017 | Yoshida | |
| 2018/0052501 A1* | 2/2018 | Jones, Jr. | G02B 6/0076 |
| 2018/0076585 A1 | 3/2018 | Harris, III et al. | |
| 2018/0210208 A1 | 7/2018 | Zhou et al. | |
| 2019/0041666 A1 | 2/2019 | Abele et al. | |
| 2020/0064652 A1 | 2/2020 | Asemani | |
| 2020/0082790 A1 | 3/2020 | Moore et al. | |
| 2023/0049339 A1 | 2/2023 | Ganguly et al. | |
| 2023/0051671 A1 | 2/2023 | Ganguly et al. | |
| 2024/0114657 A1 | 4/2024 | Helberg et al. | |
| 2024/0192506 A1 | 6/2024 | Patton et al. | |
| 2024/0219738 A1 | 7/2024 | Shams et al. | |
| 2025/0067990 A1 | 2/2025 | Ashwood et al. | |

FOREIGN PATENT DOCUMENTS

| | | |
|---|---|---|
| WO | WO-2023034967 A1 | 3/2023 |
| WO | WO-2023048995 A1 | 3/2023 |

OTHER PUBLICATIONS

"U.S. Appl. No. 18/135,400, Non Final Office Action mailed Mar. 20, 2024", 19 pgs.

"U.S. Appl. No. 18/135,400, Notice of Allowance mailed Aug. 15, 2024", 14 pgs.

"U.S. Appl. No. 18/135,400, Response filed Jun. 17, 2024 to Non Final Office Action mailed Mar. 20, 2024", 12 pgs.

U.S. Appl. No. 18/940,605, filed Nov. 7, 2024, Support Arm Thermal Structure for Extended Reality Glasses.

"U.S. Appl. No. 18/940,605, Non Final Office Action mailed Sep. 8, 2025", 13 pgs.

\* cited by examiner

RF SHIELDING STRUCTURE FOR EXTENDED REALITY GLASSES

TECHNICAL FIELD

The present disclosure relates generally to display devices and more particularly to display devices used for augmented reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects or other content (e.g., virtual objects such as 3D renderings, images, video, text, and so forth) that are generated for display to appear as a part of, and/or overlaid upon, the surrounding environment (referred to collectively as "virtual content"). This is typically referred to as "extended reality" or "XR", and it encompasses techniques such as augmented reality (AR), virtual reality (VR), and mixed reality (MR). Each of these technologies combines aspects of the physical world with virtual content presented to a user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

XR displays are typically categorized as video pass-through displays or optical see-through displays. In video pass-through, a view of the physical environment is captured by a camera, combined with virtual content, and then presented to the user on an opaque display. In optical see-through, a user views the physical environment directly through transparent or translucent displays which interpose virtual content between the user's eyes and the physical environment.

Optical see-through XR displays face a number of technical challenges in presenting realistic-looking virtual content to the user's eyes while permitting a relatively unobstructed see-through view of the physical environment. The reflectors, waveguides, diffractive gratings, and other optical components typically used in transparent or translucent XR display design often require trade-offs among various factors, including the brightness and visual quality of the virtual content, the width of the field of view for the presented virtual content, the amount of light from the physical environment passing through the transparent or translucent display, and the size, battery life, heat management, and physical robustness or resilience of the head-worn device housing the display.

In addition, head-worn XR displays often contain multiple antennas for wireless communication using interfaces such as Wi-Fi, Bluetooth™, cellular, and GPS/GNSS. Diffractive waveguide displays used in head-worn XR displays often require the use of components such as light emitting diodes (LEDs), liquid crystal on silicon (LCOS) displays, or other compatible displays, and their associated controller integrated circuits (ICs), any of which may operate at frequencies which can create radio frequency (RF) noise and interference. As a result, it may be beneficial to shield the antennas and other RF sensitive components in the device from the display system.

XR projectors also require tight optomechanical tolerances, and it is also important to minimize mechanical loading of the projector system to avoid deflections which could result in cropped images, defocusing, or distortion.

Some examples described herein may provide a grounded enclosure around the projector to block the RF noise it is generating, dual-purposing multiple other components in the system to do so. In some examples, metal components are used to define the six sides of an enclosure around the projector and its associated controller circuitry. A metal mechanical component called the support arm forms the top, rear, and bottom faces of the enclosure. The support arm is rigidly connected to a rear structural element of the eyewear frame. The support arm is used to mount other metal components forming the left, right, and front sides of the enclosure.

Other technical features may be readily apparent to one skilled in the art from the following figures, descriptions, and claims.

Figure 1:
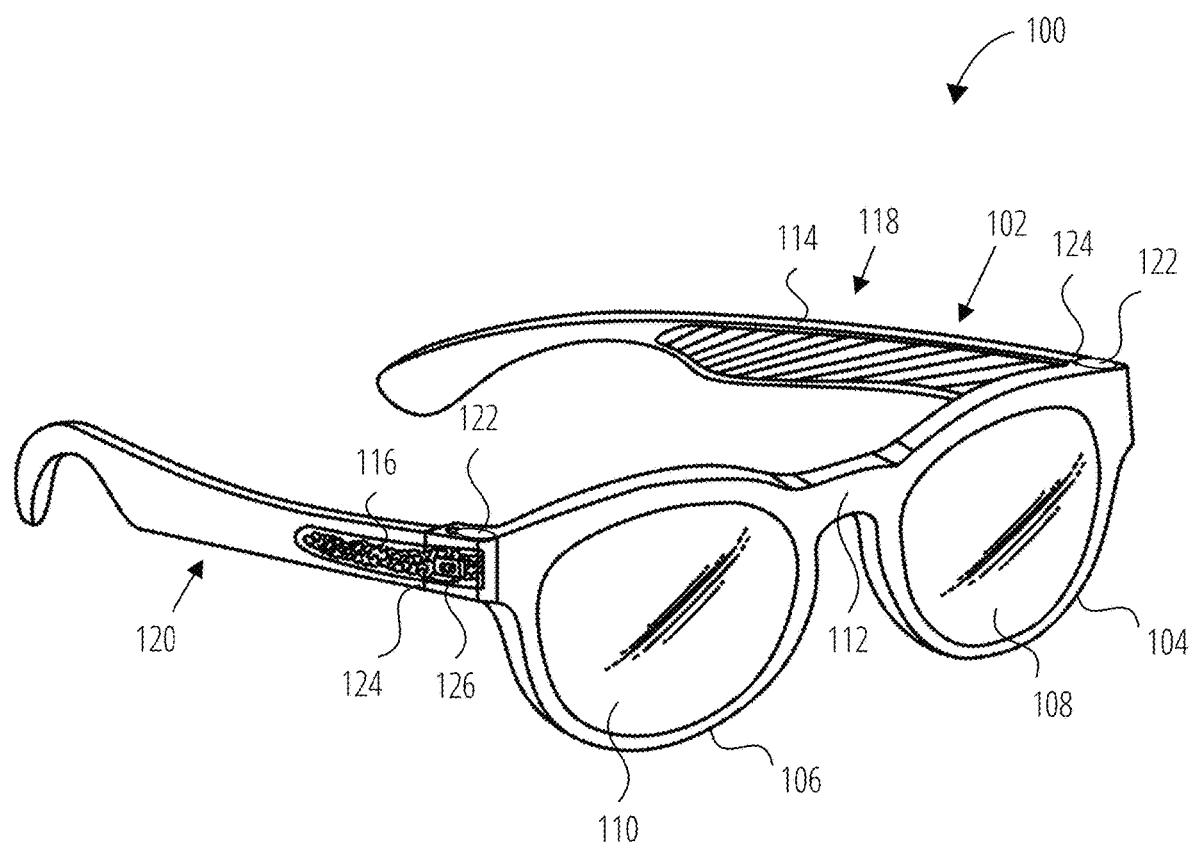
FIG. 1 is a perspective view of a head-worn device, in accordance with some examples.

FIG. 1 is perspective view of a head-worn AR device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing, incorporating a waveguide as described below with reference to FIG. 2 through FIG. 9.

The frame 102 additionally includes a left arm or temple piece 118 and a right arm or temple piece 120. In some examples the frame 102 can be formed from a single piece of material so as to have a unitary or integral construction. In some examples, such as the illustrated example, the temple pieces 118, 120 are pivotally mounted to the front portion of the frame 102 by respective hinges 124. Each side of the frame 102 has a pre-hinge portion 126 extending back from the respective optical element holder 104, 106 to the hinge. Examples described herein (and described below with reference to FIG. 3 through FIG. 11) may incorporate a support arm into the pre-hinge portion 126 configured to provide support between the optical element holders 104, 106 and the temple pieces 118, 120, as well as providing other functionality related to RF shielding.

The glasses 100 can include a computing device, such as a computer 116, which can be of any suitable type so as to be carried by the frame 102 and, in one or more examples, of a suitable size and shape, so as to be partially disposed in one of the temple piece 118 or the temple piece 120. The computer 116 can include one or more processors with memory, wireless communication circuitry, and a power source. As discussed below, the computer 116 comprises low-power circuitry, high-speed circuitry, and a display processor. Various other examples may include these elements in different configurations or integrated together in different ways.

The computer 116 additionally includes a battery 114 or other suitable portable power supply. In some examples, the battery 114 is disposed in left temple piece 118 and is electrically coupled to the computer 116 disposed in the right temple piece 120. The glasses 100 can include a connector or port (not shown) suitable for charging the battery 114, a wireless receiver, transmitter or transceiver (not shown), or a combination of such devices.

User input may be provided by one or more buttons 122, which in the illustrated examples are provided on the outer upper edges of the left optical element holder 104 and right optical element holder 106. The one or more buttons 122 provide a means whereby the glasses 100 can receive input from a user of the glasses 100.

Figure 2:
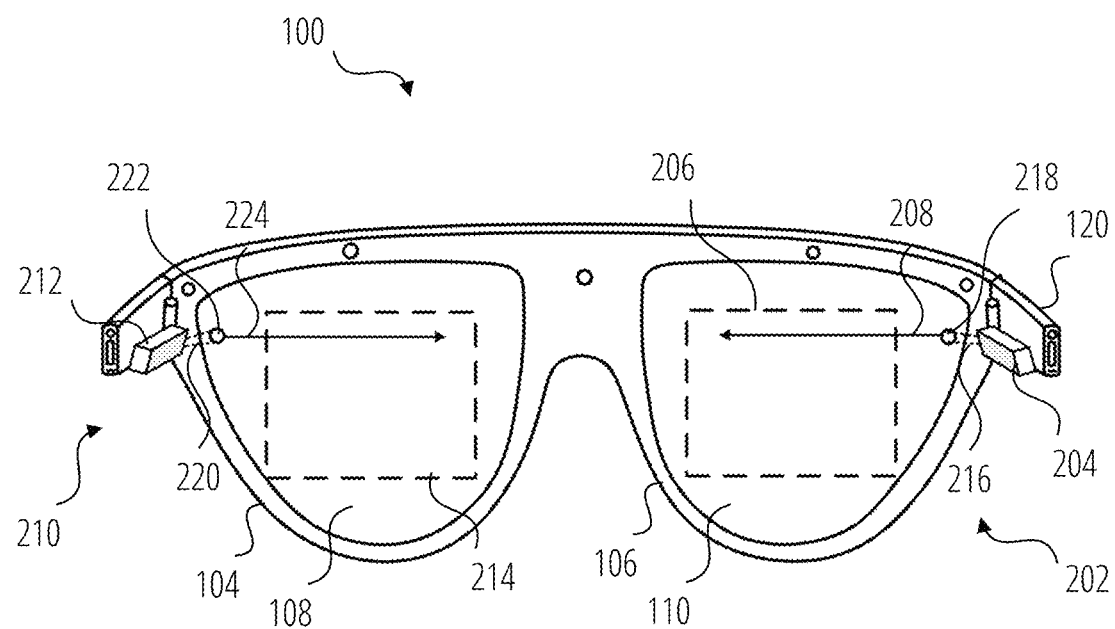
FIG. 2 illustrates a rear view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 214. The forward optical assembly 202 may also be referred to herein, by itself or in combination with one or both of the respective optical elements 108, 110, as an optical see-through AR display.

In some examples, the near eye displays are waveguides. The waveguides include reflective or diffractive structures (e.g., gratings and/or optical elements such as mirrors, lenses, or prisms). On the right side of the glasses 100, projected light 216 emitted by the projector 204 encounters the input optical element 218 (e.g., diffractive structure) of the waveguide of the near eye display 206, which directs the projected light 216 as light 208 towards the right eye of a user to provide an image on or in the right optical element 110 that overlays the view of the real world seen by the user. Similarly, projected light 220 emitted by the projector 212 encounters the input optical element 222 (e.g., diffractive structure) of the waveguide of the near eye display 214, which directs the projected light 220 as light 224 towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate a virtual content overlay on the real world view of the user including display of a 3D user interface to the user of the glasses 100. The surface of the optical element 108, 110 from which the projected light exits toward the user's eye is referred to as a user-facing surface of the optical see-through AR display.

Examples described herein with reference to FIG. 3 through FIG. 11 below may situate the projectors 204, 212 within the pre-hinge portion 126 of each side of the frame 102. Each projector 204, 212 in such examples may be configured to project light through an aperture formed in the rear face of the optical element holder. The input optical elements 218 in such examples may be formed in a portion of the optical element 108, 110 that extends within the respective optical element holder 104, 106, such that the light projected by each projector 204, 212 passes through the aperture in the rear face of the optical element holder 104, 106 to enter the input optical element 218 of the respective optical element 108, 110. However, in FIG. 2, the projectors 204, 212 are shown exterior to the frame 102 and located behind the hinge 124 for visual clarity.

The combination of a GPU, the forward optical assembly 202, the left optical element 108, and the right optical element 110 provide an optical engine of the glasses 100. The glasses 100 use the optical engine to generate an overlay of the real world view of the user including display of a 3D user interface to the user of the glasses 100. The surface of the optical element 108, 110 from which the projected light exits toward the user's eye is referred to as a user-facing surface of the optical see-through AR display.

In use, a user of the glasses 100 will be presented with information, content and various 3D user interfaces on the near eye displays. The user can then interact with the glasses 100 using the buttons 122, voice inputs or touch inputs on an associated device.

In some examples, one or more further optical lenses may be used to adjust the presentation of the virtual content to the user's eye. For example, lenses can be placed on the user-facing side and/or the exterior side of the near eye display 206 or 214 to modulate the plane in front of the user's eye where that the virtual content appears, i.e., to adjust the perceived distance of the virtual content from the user's eye. The near user-facing side lens (also called an eye-side lens) affects the perceived distance of the virtual content in front of the user; while the exterior side lens (also called a world-side lens) is provided to neutralize the effect of the near side lens on real-world objects. In some examples, an ophthalmic lens can be positioned on the eye side of the near eye display 206 or 214 to allow users needing visual correction to correctly perceive the virtual content. It will be appreciated that examples described herein can be combined with various AR display designs.

Figure 3:
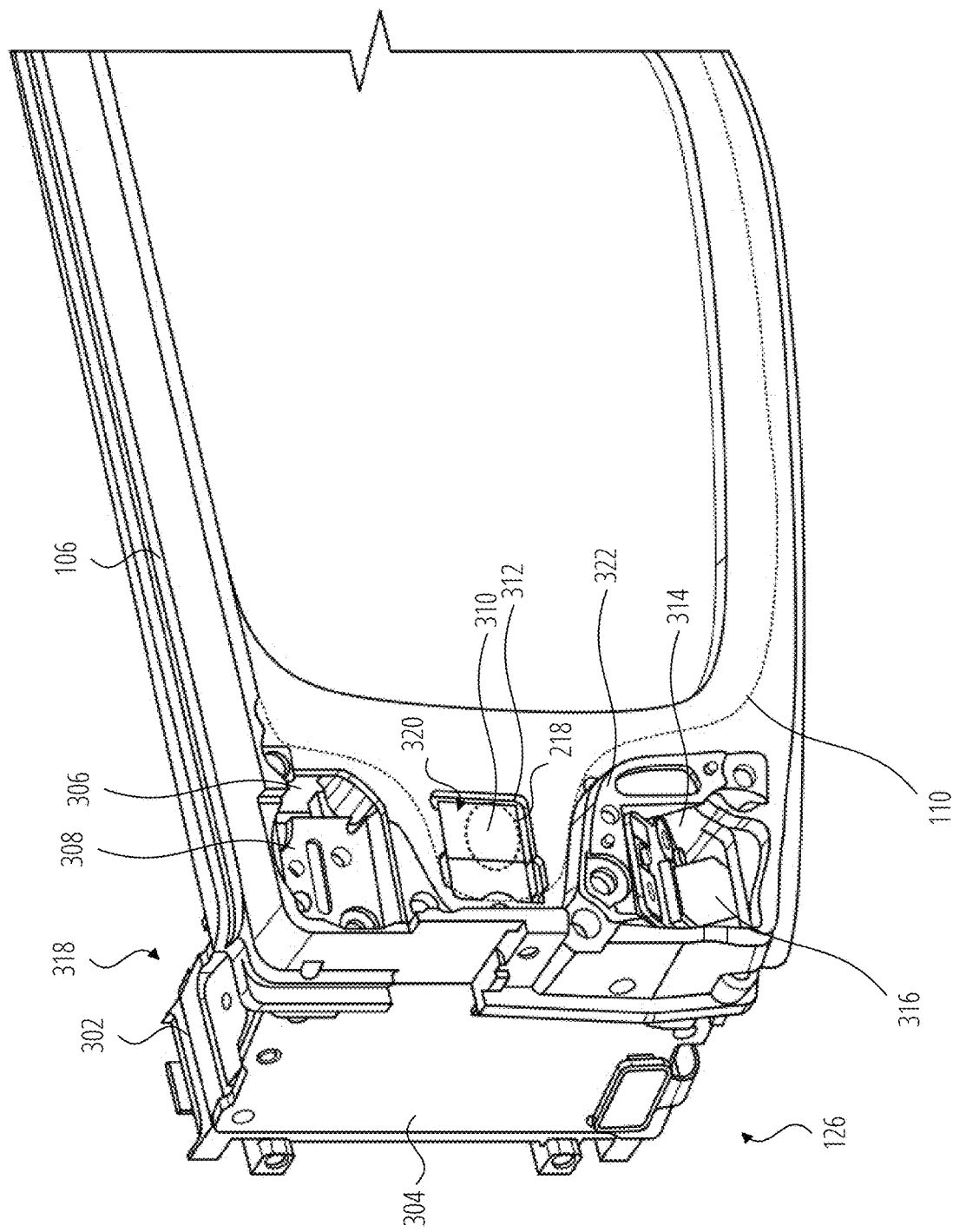
FIG. 3 illustrates a partial front perspective view of a frame of a head-worn device including a support arm assembly, in accordance with some examples.

FIG. 3 shows a partial front perspective view of the frame 102 of the head-worn device—specifically, a portion of the right optical element holder 106 attached to a support arm assembly 318. The right optical element holder 106 is shown with a front face thereof removed, exposing internal components thereof. Whereas examples are described with reference to the right-side components of the glasses 100, it will be appreciated that the examples described herein can be applied equally to the left side of the glasses 100. Furthermore, whereas examples are described with reference to the orientation of a right-side structure, such that a left face corresponds to a first side face and a right face corresponds to a second side face, it will be appreciated that on the left-hand side of the glasses 100 these correspondences and any other left-right correspondences will be reversed.

The right optical element holder 106 is configured to hold the right optical element 110 (shown in dashed lines), which includes the input optical element 218 (also shown as dashed lines) in a location such that light projected from an interior of the pre-hinge portion 126 is directed through a middle frame aperture 312 to contact the input optical element 218. Specifically, the light projected from an exit pupil 310 of the projector 204 (not visible other than the exit pupil 310) contacts the input optical element 218 to create an image on the near eye display 206 of the right optical element 110 as described above with reference to FIG. 2.

The projector 204 is housed within a support arm assembly 318, which attaches structurally to the right optical element holder 106 to form a load-bearing structural support. In FIG. 3, the support arm assembly 318 is shown fully assembled to form an electrically grounded enclosure for the projector configured to provide radio frequency (RF) shielding for the projector. A support arm 302 forms the top, bottom, and rear faces of the enclosure. A right face 304 encloses the projector 204 on the outside of the pre-hinge portion 126, electrically coupled to the support arm 302 by one or more ground elements such as exposed metal elements on an inside surface (in this example, the left surface) of the right face 304 facing the support arm 302. (Various electrical couplings described herein may be established by direct contact or through intermediate conductive elements, such as conductive tape or conductive foam.) A front face of the enclosure includes an aperture for the exit pupil 310, a front upper component 308 visible through an upper frame aperture 306 formed through the right optical element holder 106, and a front lower component 316 visible through a lower frame aperture 314 formed through the right optical element holder 106. In some embodiments, the front upper component 308 and/or front lower component 316 may include optical elements configured to communicate optically through the front face of the right optical element holder 106, such as cameras, other optical sensors, or optical projectors.

The support arm assembly 318 is rigidly fixed to a rear portion of the optical element holder (e.g., right optical element holder 106). In some examples, the support arm assembly 318 only contacts the projector (e.g., projector 204) through conductive foam components and/or thermal interface materials. The hinge 124 and/or temple piece 120 are rigidly fixed to the support arm assembly 318, as described in greater detail below. When the head-worn device is worn on a user's head, the mechanical loading of the temple piece 120 and hinge 124 (which may be jointly or separately considered a rear structural element) may be transferred directly to the rear portion of the right optical element holder 106 via the support arm assembly 318. Sufficient assembly clearance around the projector 204 prevents significant mechanical loading of the optical system of the projector 204, which is very sensitive. Thus, the support arm assembly 318 (and in particular, the support arm 302 thereof) provides a structural support between the rear structural element (e.g., hinge 124 and/or temple piece 120) and the optical element holder (e.g., right optical element holder 106) without placing mechanical load on the projector (e.g., projector 204).

In some examples, the front-facing surfaces of the projector 204 are shielded using a number of components of the support arm assembly 318 and/or the right optical element holder 106. In the illustrated example, a metal front face of the enclosure (described in greater detail with reference to FIG. 4 below) includes a metal bracket 322 for securing a front lower component 316, such as a camera, to the right optical element holder 106. The right optical element holder 106 may also include a metal material serving to further ground and shield the front surfaces of the projector 204. In some examples, the projector 204 radiates a substantial portion of its RF radiation through its front surfaces, such that the front face (including the metal bracket 322 and front upper component 308) and the right optical element holder 106 are operable to block, shield, and/or ground a substantial portion of the RF radiation of the projector 204.

In some examples, the RF radiation from the front surfaces of the projector 204 may be further shielded and/or grounded by a coating of a conductive material applied across the exit pupil 310 of the projector 204. For example, a coating of a transparent or semi-transparent conductive material, such as indium tin oxide, may be applied across an outer lens covering the exit pupil 310. This coating may be configured to ground RF frequencies having a center frequency below 20 GHz. The coating is shown in FIG. 3 as ITO coating 320.

In some examples, the support arm 302 is formed at least in part from a metal material, and may be referred to as a metal support arm. In some examples, the front face of the enclosure (including front upper component 308) is formed at least in part from a metal material.

As will be described in greater detail below, the support arm assembly 318 is configured to provide a load-bearing structural support between the right optical element holder 106 (in front) and the hinge 124 and temple piece 120 (in the rear), while enclosing the projector 204 and preventing the projector 204 from being exposed to mechanical loading.

Thus, in some examples, a head-worn device (e.g., glasses 100) is provided that includes a support arm assembly 318 defining an electrically grounded enclosure for a projector 204 configured to provide radio frequency (RF) shielding for the projector 204. The support arm assembly 318 includes a metal support arm 302 configured to form a rear face, a bottom face, and a top face of the enclosure, and configured to structurally attach to a rear structural element of the head-worn device (e.g., hinge 124 and/or temple piece 120) and to an optical element holder (e.g., right optical element holder 106) of the head-worn device, such that the metal support arm 302 forms a structural support joining the optical element holder to the rear structural element without placing mechanical load on the projector 204. The support arm assembly 318 includes a metal front face of the enclosure configured to structurally attach to the optical element holder (e.g., right optical element holder 106) of the head-worn device, and defining a front aperture (e.g., a projector front aperture, described below) for permitting passage of light from an exit pupil 310 of the projector 204 toward an input optical element 218 of the head-worn device. The support arm assembly 318 includes a first side face of the enclosure (e.g., left face, described below) electrically coupled to the metal support arm 302. The support arm assembly 318 also includes a second side face of the enclosure (e.g., right face 304, described below) electrically coupled to the metal support arm 302.

The enclosure may also include a coating of conductive material applied across the exit pupil 310 of the projector 204, the conductive material being effective to permit passage of at least a portion of the light from the exit pupil 310 and to block at least a portion of RF radiation.

Figure 4:
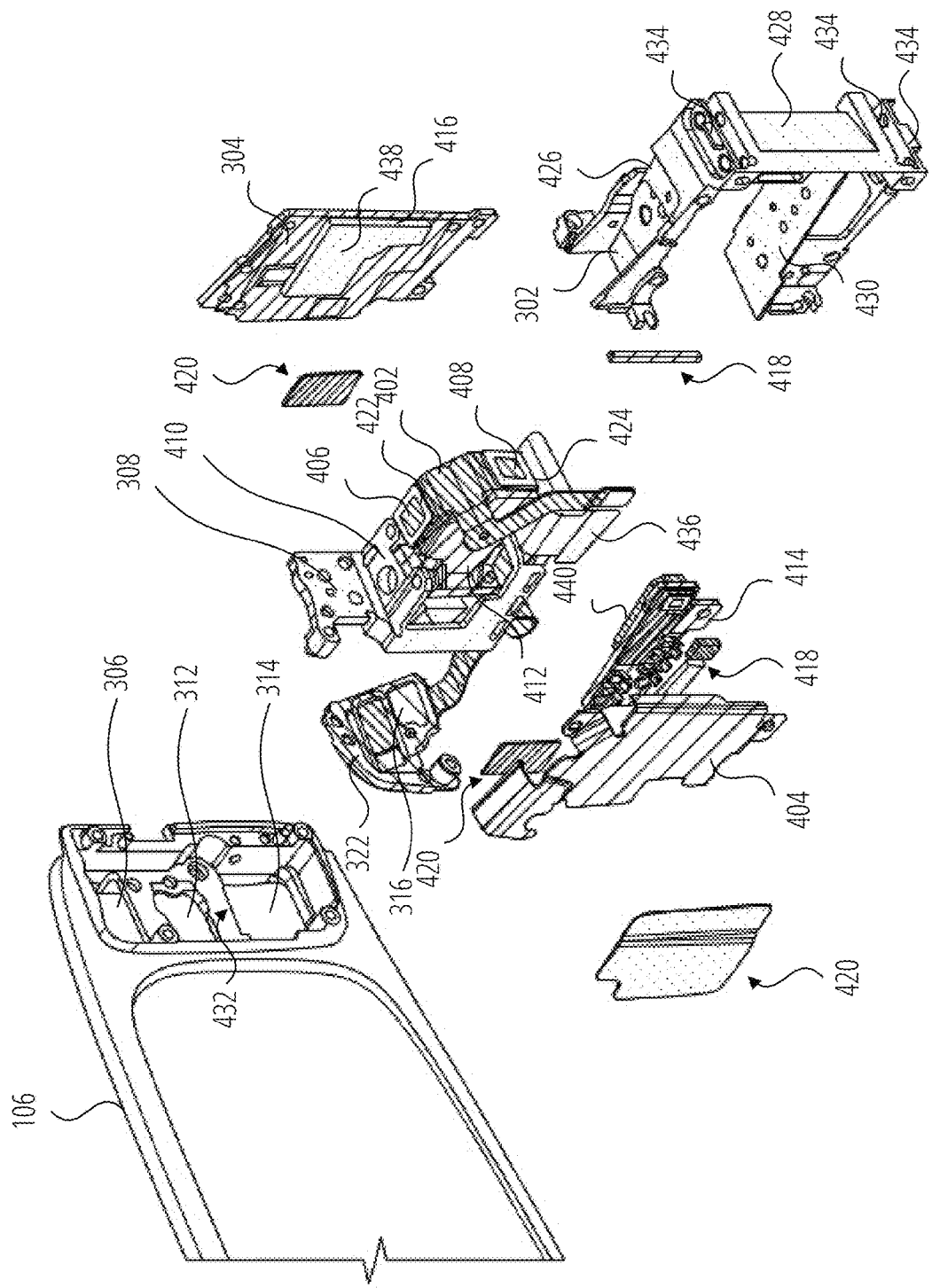
FIG. 4 illustrates an exploded rear left perspective view of the support arm assembly of FIG. 3, in accordance with some examples.

FIG. 4 shows an exploded rear left perspective view of the support arm assembly 318. The rear view shows that the right optical element holder 106 defines the upper frame aperture 306, middle frame aperture 312, and lower frame aperture 314 at the front of a cavity 432 configured to accommodate and secure the support arm assembly 318. A front casing of the support arm assembly 318, shown as front face 410, fits into the cavity 432, with the front lower component 316 shown as a separate component situated in front of a lower part of the front face 410 to extend through the lower frame aperture 314. In the illustrated embodiment, the front lower component 316 is coupled to the right optical element holder 106 via the metal bracket 322. The front upper component 308 is part of the front face 410 in this example, and it is positioned level with the upper frame aperture 306. The projector 204 is coupled to the front face 410 such that the exit pupil 310 (not visible in FIG. 4) can project light through a front aperture (referred to as a projector front aperture, not shown) of the front face 410 situated level with the middle frame aperture 312.

In some examples, the front face 410 includes an electrically conductive material electrically coupled to the projector 204 and the support arm 302 and configured to provide RF shielding and grounding for the projector. In some examples, the conductive material of the front face 410 includes a metal material. In some examples, the right optical element holder 106 includes an electrically conductive material, such as a metal material, electrically coupled to the front face 410 and configured to act as a further shielding and/or grounding component. In the illustrated example, the front face 410 forms part of a metal casing for at least some of the components of the projector 204, such as internal components of the projector 204 located in a front portion thereof, near the exit pupil 310. The front face 410 may define a projector front aperture (described below with reference to FIG. 7) through which the exit pupil 310 of the projector 204 projects its light.

Thus, in some examples, the front face 410 defines at least a portion of a casing for internal components of the projector 204. The front face 410 further includes a metal bracket 322 for mounting a component to the optical element holder (e.g., right optical element holder 106), the metal bracket 322 being electrically coupled to the front face 410. In some examples, the optical element holder includes a conductive material configured to ground the support arm assembly 318.

The projector 204 includes a plastic projector casing 412. The projector 204 may also include board-to-board (BTB) electrical contacts for grounding electrical components of the projector, shown as projector BTB contacts 436.

The right face of the enclosure in the illustrated example is shown as a printed circuit board (PCB), right PCB 416. The backside of the right PCB 416 has one or more exposed ground areas for electrical coupling to the support arm 302 and has a ground plane 438 sized and shaped to substantially cover and shield the right side of the projector 204. In some examples, heavy via stitching around the perimeter of the ground plane 438 is used to connect several layers of conductive material, thereby increasing the thickness of the ground material of the ground plane 438. In some examples, the thick ground plane 438 is effective to pull ground currents generated by the projector 204 toward the right PCB 416, where the high frequency components of the ground currents may be burned off (e.g., blocked or dissipated) by lossy electrical components (e.g., chokes, such as inductors) of the right PCB 416.

Thus, in some examples, a second side face of the enclosure (e.g., right face 304) includes a PCB (right PCB 416) including a ground plane electrically coupled to the metal support arm 302 via one or more ground elements (e.g., ground element 324). The ground plane includes a plurality of conductive layers electrically joined by via stitching around a perimeter of the ground plane. The ground plane is configured to pull ground currents towards the PCB of the second side face, such that one or more lossy electrical components of the PCB of the second side face, such as comprise one or more chokes, are effective to block high frequency RF ground currents.

The left face 404 of the enclosure in the illustrated example is shown as a sheet metal component sized and shaped to provide RF shielding and/or grounding to the left-hand (inner) surface of the projector 204. The sheet metal component is electrically coupled to one or more electrical grounding contacts of various components of the projector 204 (e.g., LEDs and/or LCOS display) and/or other powered components of the glasses 100 (e.g., one or more cameras) mounted on a left PCB 414, which is sandwiched between the left face 404 and the projector 204. These grounding contacts may be electrically coupled to one or more grounded BTB stiffeners of the left PCB 414, such as a left PCB shield can 440 having an inner wall. In some examples, the left PCB shield can 440 may connect to the support arm 302 via one or more pieces of conductive foam 418. The left PCB 414 is configured to electrically communicate with the projector BTB contacts 436, such as through the grounding contacts. In some examples, the left PCB 414 houses at least a portion of the control logic for the projector 204.

Thus, in some examples, a first side face of the enclosure (e.g., left face 404) includes a sheet metal component electrically coupled to the metal support arm 302, and further includes a PCB (left PCB 414) having a shield can (left PCB shield can 440) electrically coupled to the sheet metal component. The sheet metal component is also electrically coupled to the metal support arm 302 via a conductive foam component (conductive foam 418) in some examples.

FIG. 4 shows various flexible conductive tape 420 and/or conductive foam 418 components. In some examples, such flexible conductive component may be included in the overall structure of the support arm assembly 318 for the purpose of electrically coupling various components together, providing deformable cushioning for various components, and/or patching gaps or holes in the shielding structure between the faces of the enclosure and/or between various components making up those faces. The six faces of the enclosure, assisted by the flexible conductive components, may thereby provide an enclosed or substantially enclosed box or enclosure that provides a grounded RF shield between the projector 204 and other components of the glasses 100.

Thus, in some examples, the support arm assembly 318 further includes one or more flexible conductive components, such as conductive foam 418 and/or conductive tape 420, configured to patch gaps between components of the enclosure.

In the rear view of FIG. 4, the shape of the support arm 302 can be seen to form a top face 426, a rear face 428, and a bottom face 430 of the enclosure for the projector 204. The support arm 302 also includes various rear structural element attachment structures 434 configured to enable attachment to the rear structural element, such as a hinge 124. In FIG. 4, the rear structural element attachment structures 434 are shown as rectangular tabs and circular apertures at both the top edge and bottom edge of the rear face 428.

Figure 5:
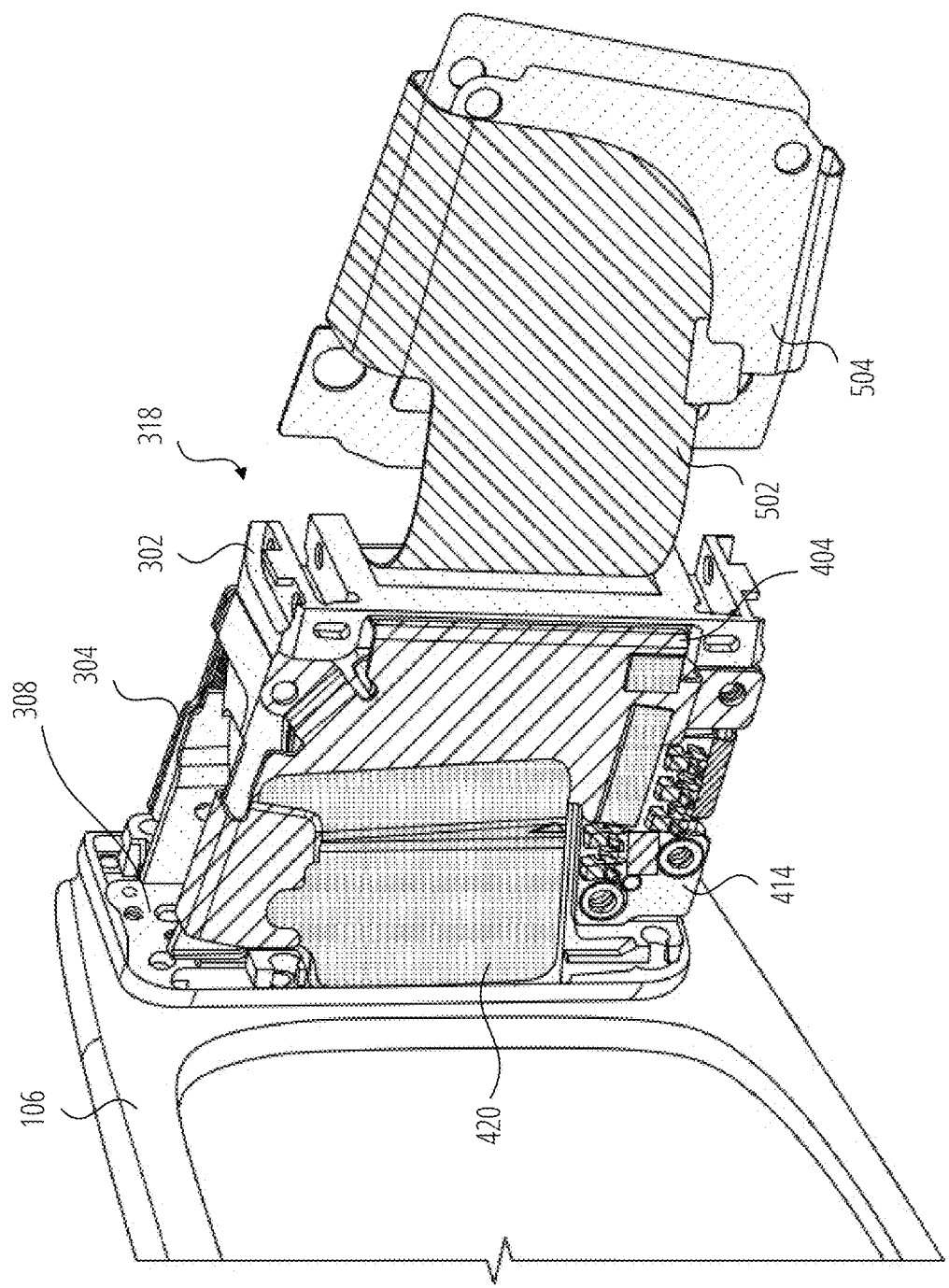
FIG. 5 illustrates a left rear perspective view of the support arm assembly of FIG. 3 attached to a post-hinge housing, in accordance with some examples.

FIG. 5 shows a left rear perspective view of the support arm assembly 318. Conductive tape 420 can be seen applied to the outer surface of left face 404. Electrical leads (e.g., grounding contacts) of the left PCB 414 are exposed below the left face 404.

In this example, a flexible rear connector 502 is connected to the right PCB 416 and wraps around a location to the rear of the support arm 302 that could be occupied by a hinge 124 in the finished head-worn device. The flexible rear connector 502 connects, behind the location of the hinge 124, to a post-hinge housing 504 situated within temple piece 120 in the assembled head-worn device. In some examples, the flexible rear connector 502 is an electrical connector configured to enable electrical communication between components of the right PCB 416 and components housed within the post-hinge housing 504. In some examples, the right PCB 416 may be configured to electrically communicate with various other components housed within the support arm assembly 318, such as projector 204 and/or left PCB 414.

Figure 6:
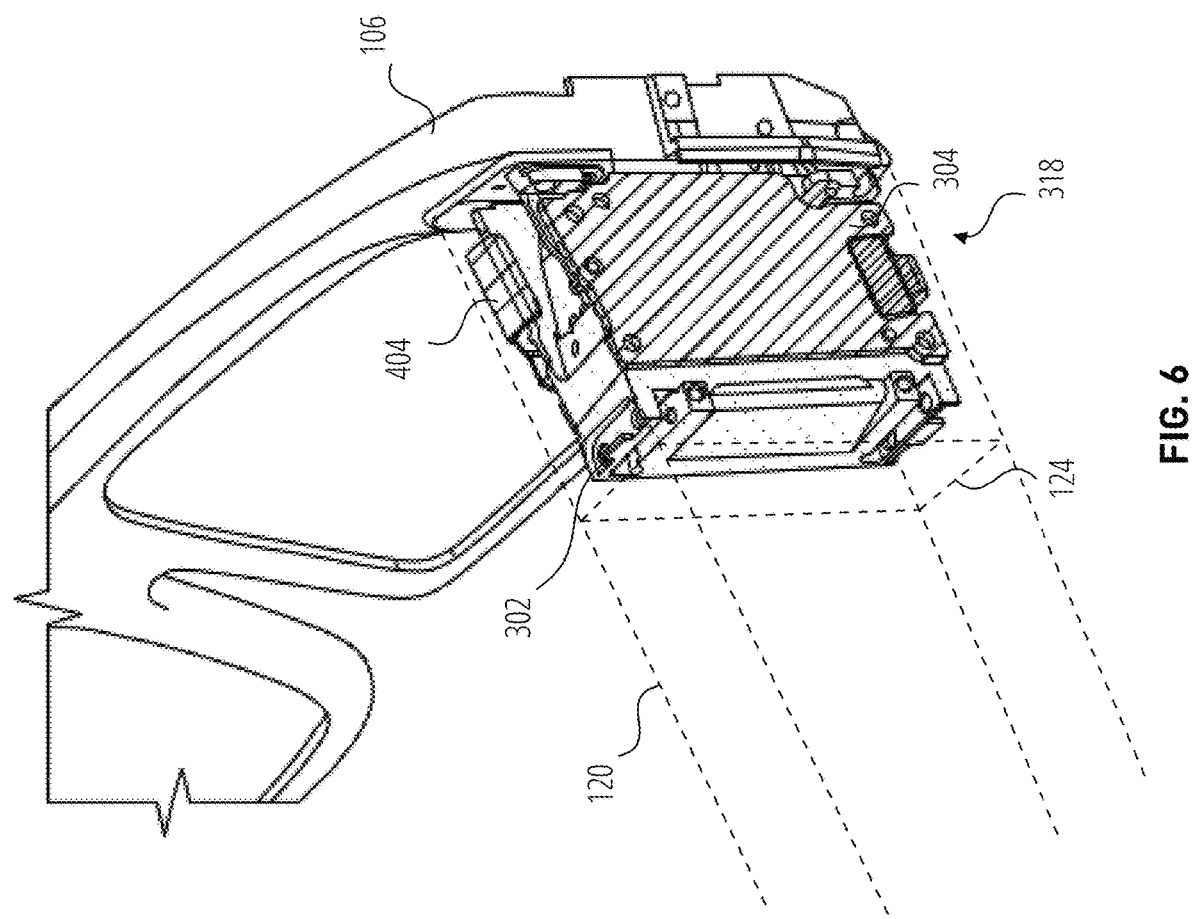
FIG. 6 illustrates a right rear perspective view of the support arm assembly of FIG. 3, in accordance with some examples.

FIG. 6 shows a right rear perspective view of the support arm assembly 318. In this view, the outline of an example temple piece 120, and a plane defining the pivot point of an example hinge 124, are shown in dashed lines. It will be appreciated that example support arm assemblies 318 described herein may be used in combination with various rear structural elements, optical element holders, and so on in different examples. The rear structural element may also assist in grounding the support arm assembly 318 via the support arm 302, and to that end may consist at least in part of an electrically conductive material.

Thus, in some examples, the rear structural element includes a hinge 124, and/or may include a conductive material configured to ground the support arm assembly 318.

Figure 7:
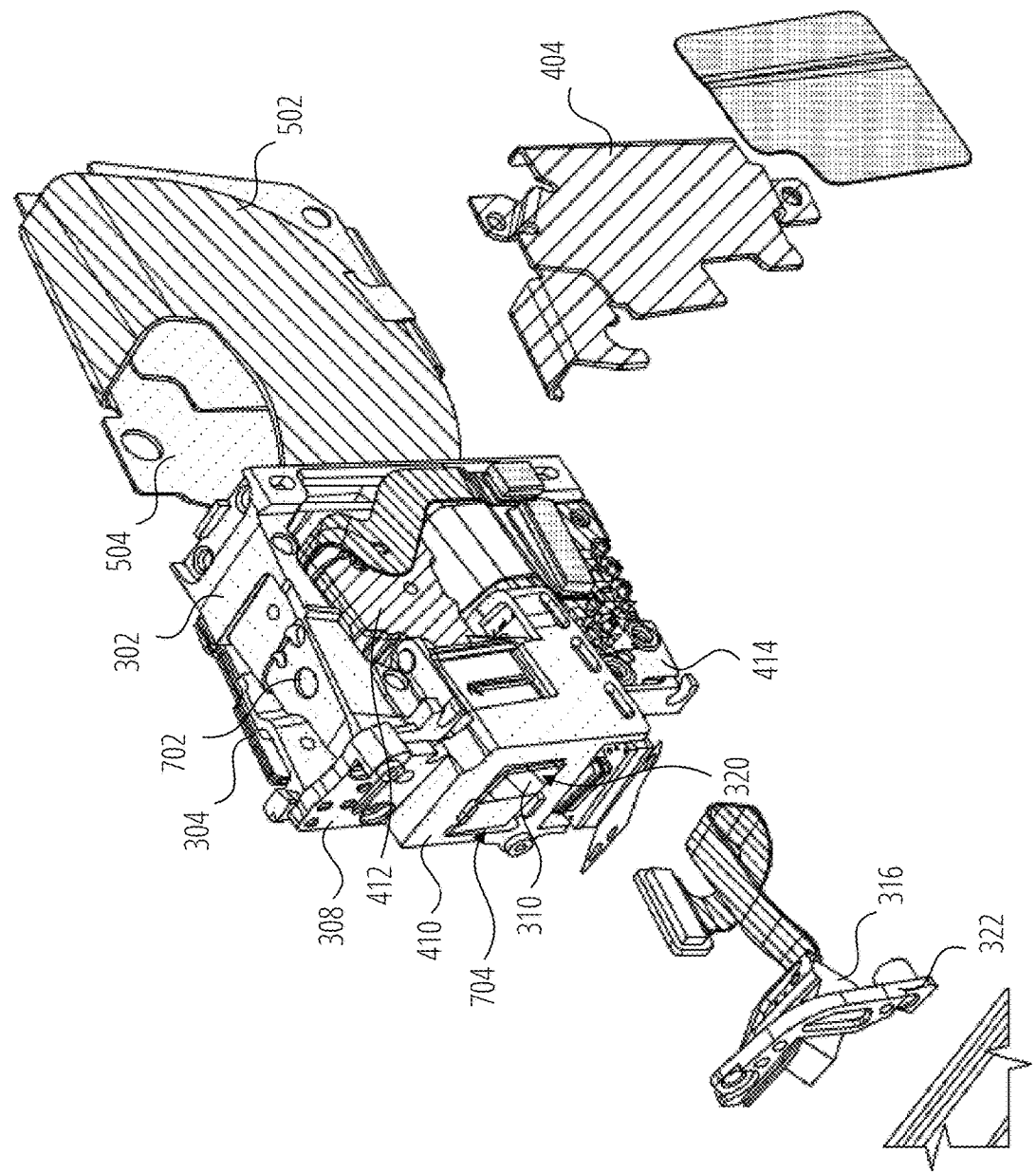
FIG. 7 illustrates a left front perspective partially exploded view of the support arm assembly of FIG. 3 attached to the post-hinge housing, in accordance with some examples.

FIG. 7 shows a left front perspective partially exploded view of the support arm assembly 318 attached to the post-hinge housing 504. In this view, the front aperture defined by the front face 410 is shown as projector front aperture 704, through which the exit pupil 310 projects its light.

Figure 8:
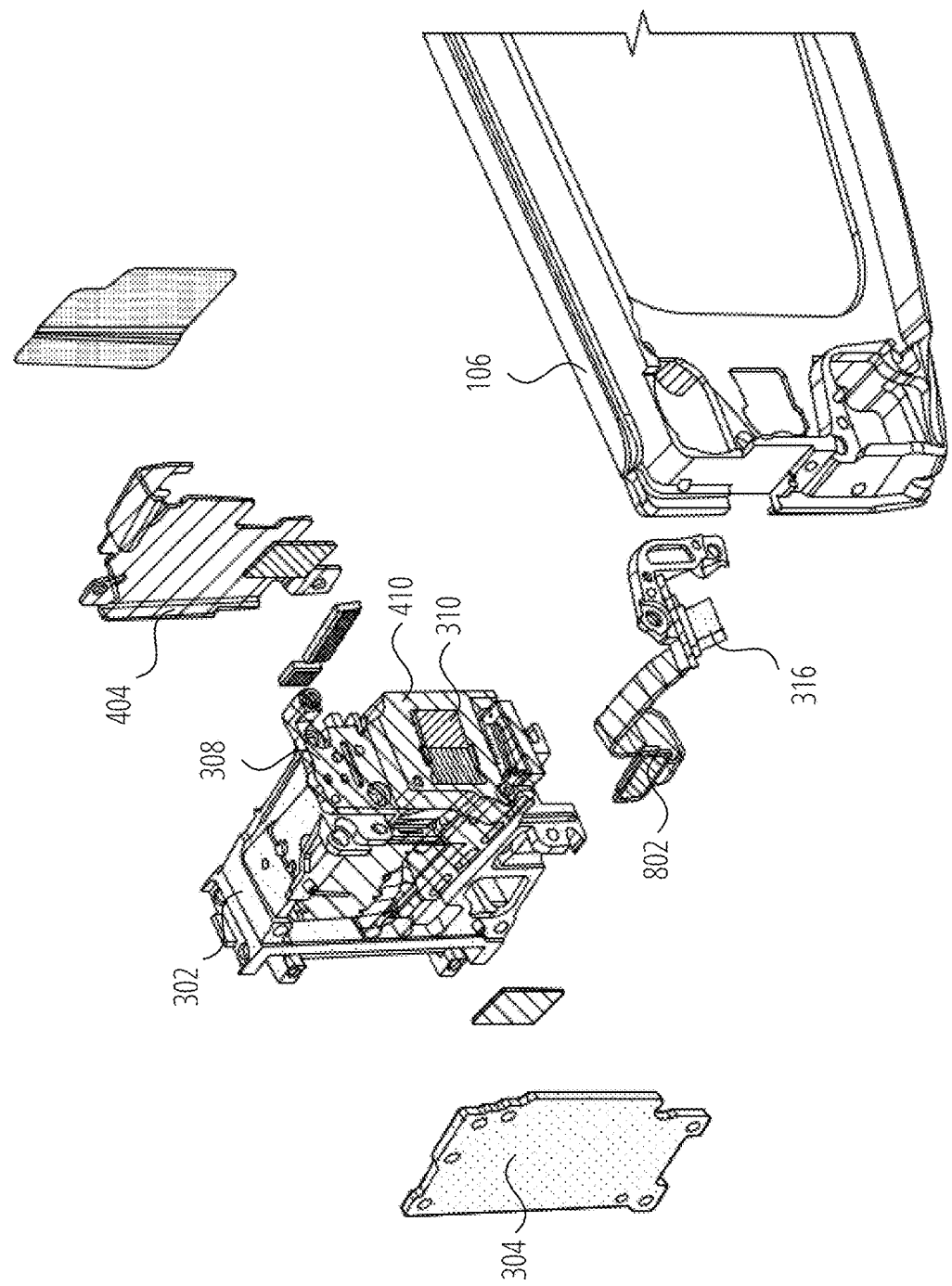
FIG. 8 illustrates an exploded front right perspective view of the support arm assembly of FIG. 3, in accordance with some examples.

FIG. 8 shows an exploded front right perspective view of the support arm assembly 318. The various components and their spatial relationships can be seen more clearly in this drawing, such as the shape of example front lower component 316, which in the illustrated example includes a circuit component 802 connected via an electrical connector to the main body of the front lower component 316 situated within the cavity 432 of the right optical element holder 106. The circuit component 802 is positioned to electrically communicate with the right PCB 416 when the device is assembled, as shown in FIG. 6 above.

Figure 9:
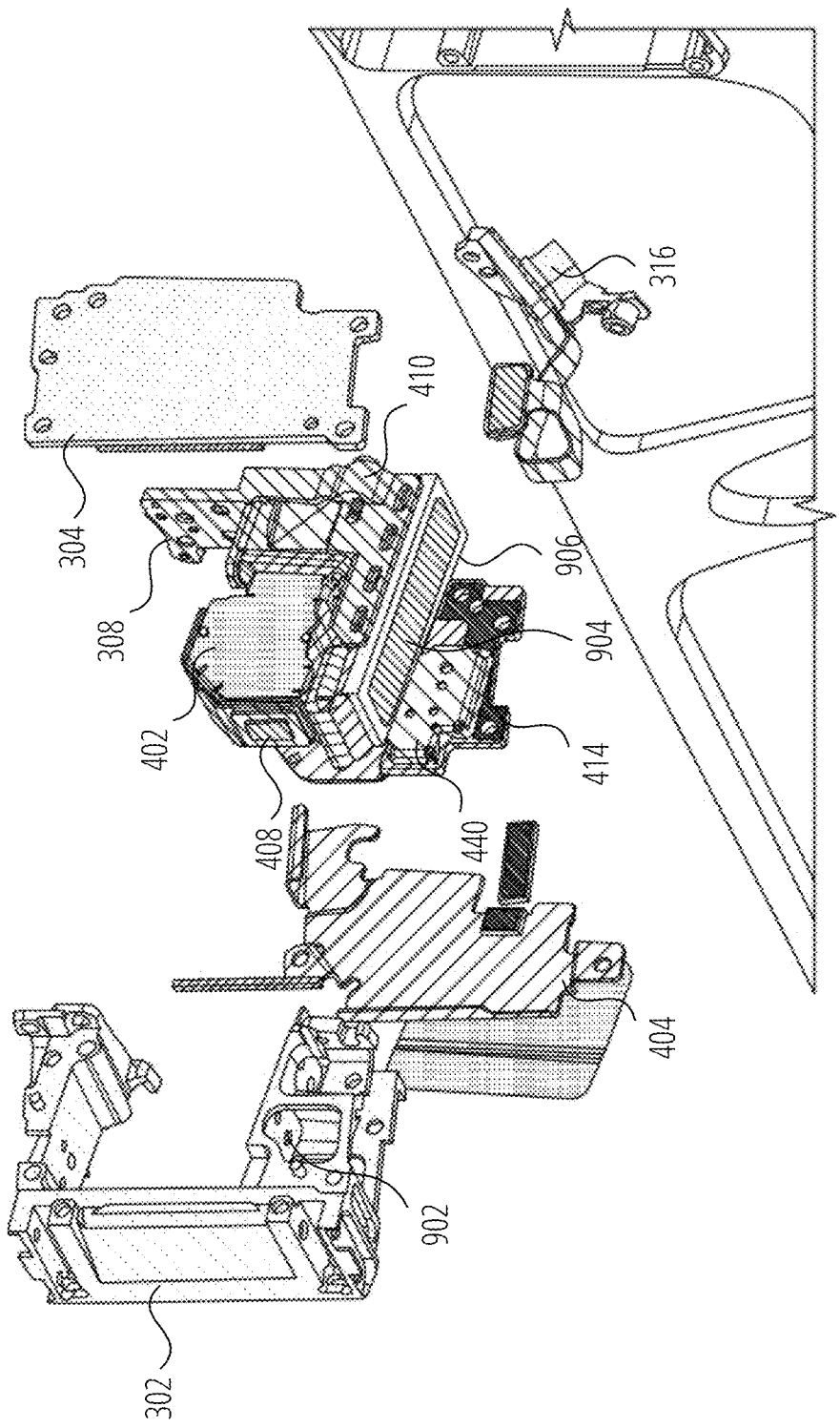
FIG. 9 illustrates an exploded rear right lower perspective view of the support arm assembly of FIG. 3, in accordance with some examples.

FIG. 9 shows an exploded rear right lower perspective view of the support arm assembly 318. Also visible in this view is the left PCB shield can 440 configured to shield RF-sensitive elements of the left PCB 414.

Figure 10:
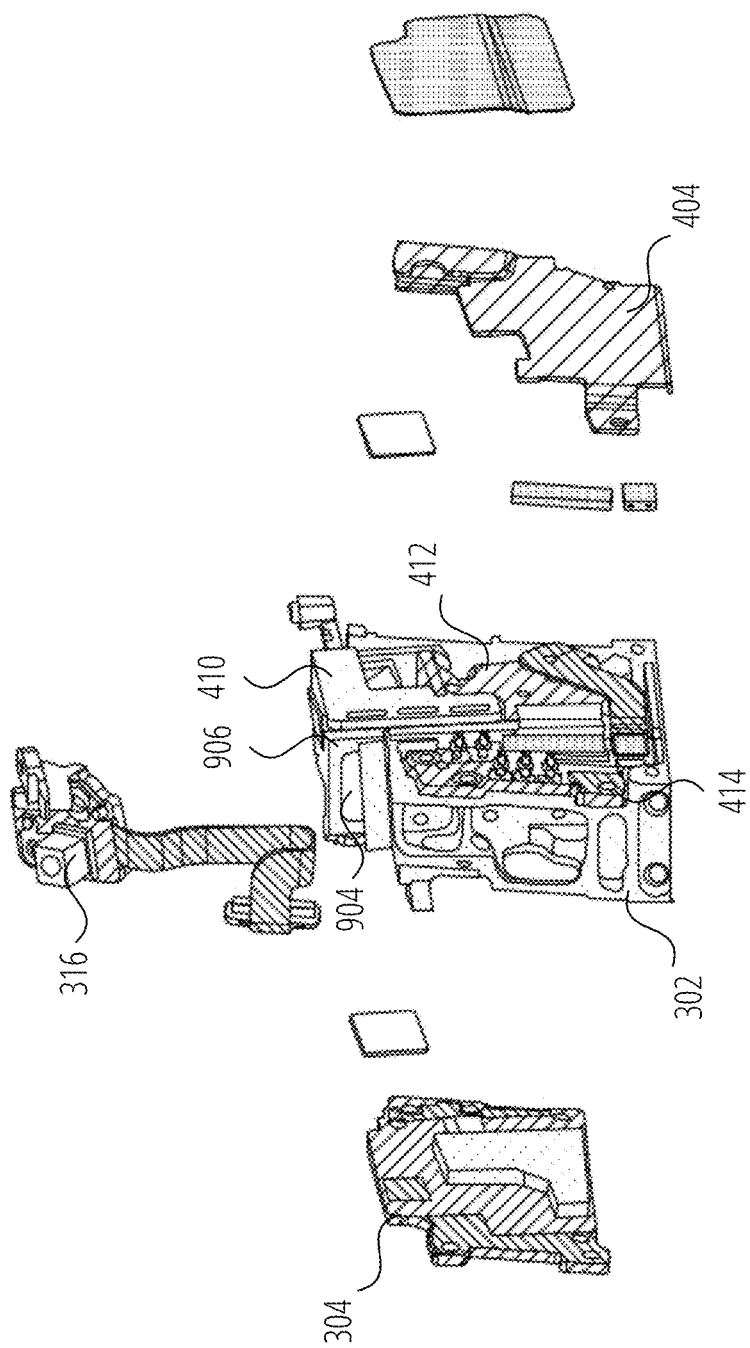
FIG. 10 illustrates an exploded left lower perspective view of the support arm assembly of FIG. 3, in accordance with some examples.

FIG. 10 shows an exploded left lower perspective view of the support arm assembly 318.

Figure 11:
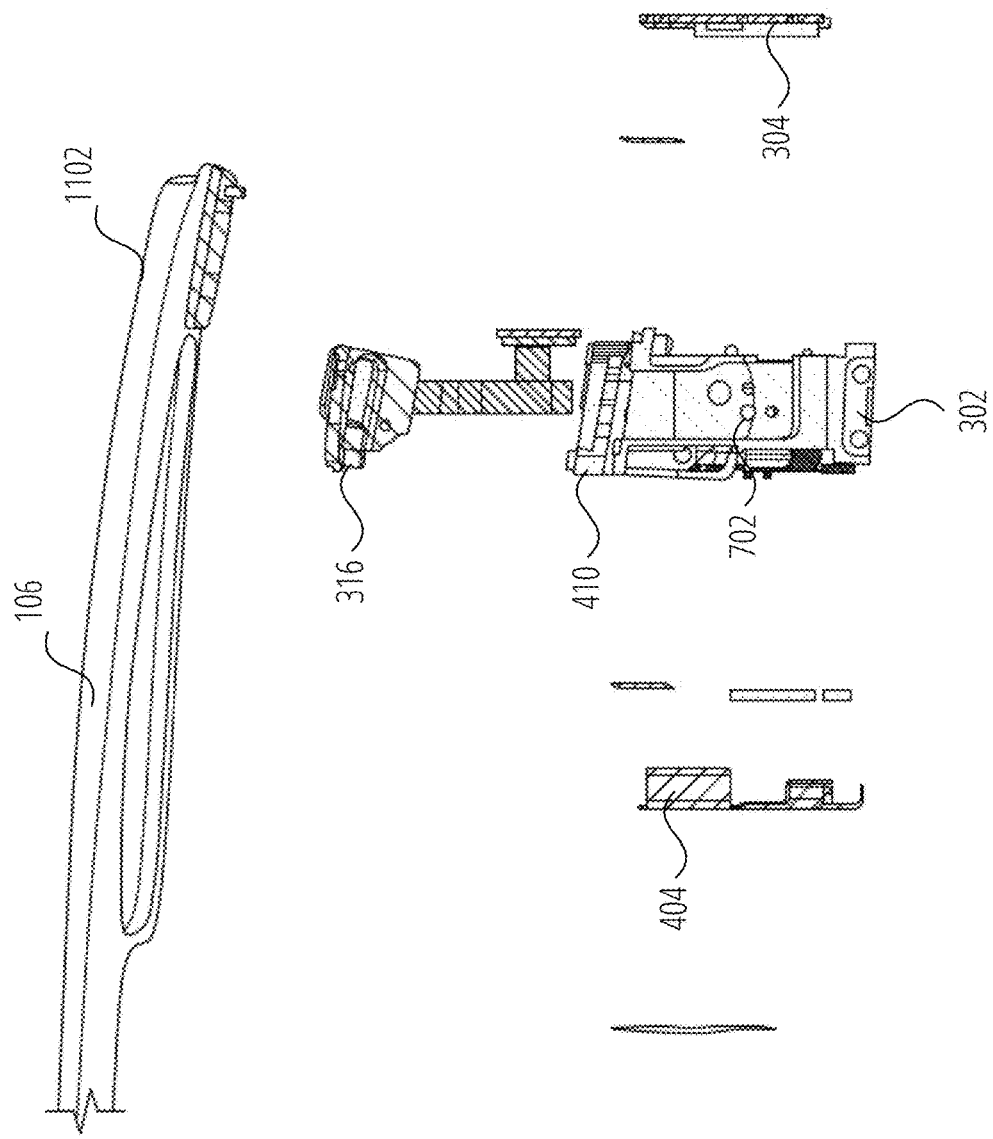
FIG. 11 illustrates an exploded plan view of the support arm assembly of FIG. 3, in accordance with some examples.

FIG. 11 shows an exploded plan view of the support arm assembly 318. In this plan view, the edge of the front face 1102 of the rear portion of the right optical element holder 106 is shown. In the illustrated embodiment, front face 1102 defines the upper frame aperture 306, middle frame aperture 312, and lower frame aperture 314 of FIG. 3.

Machine Architecture

Figure 12:
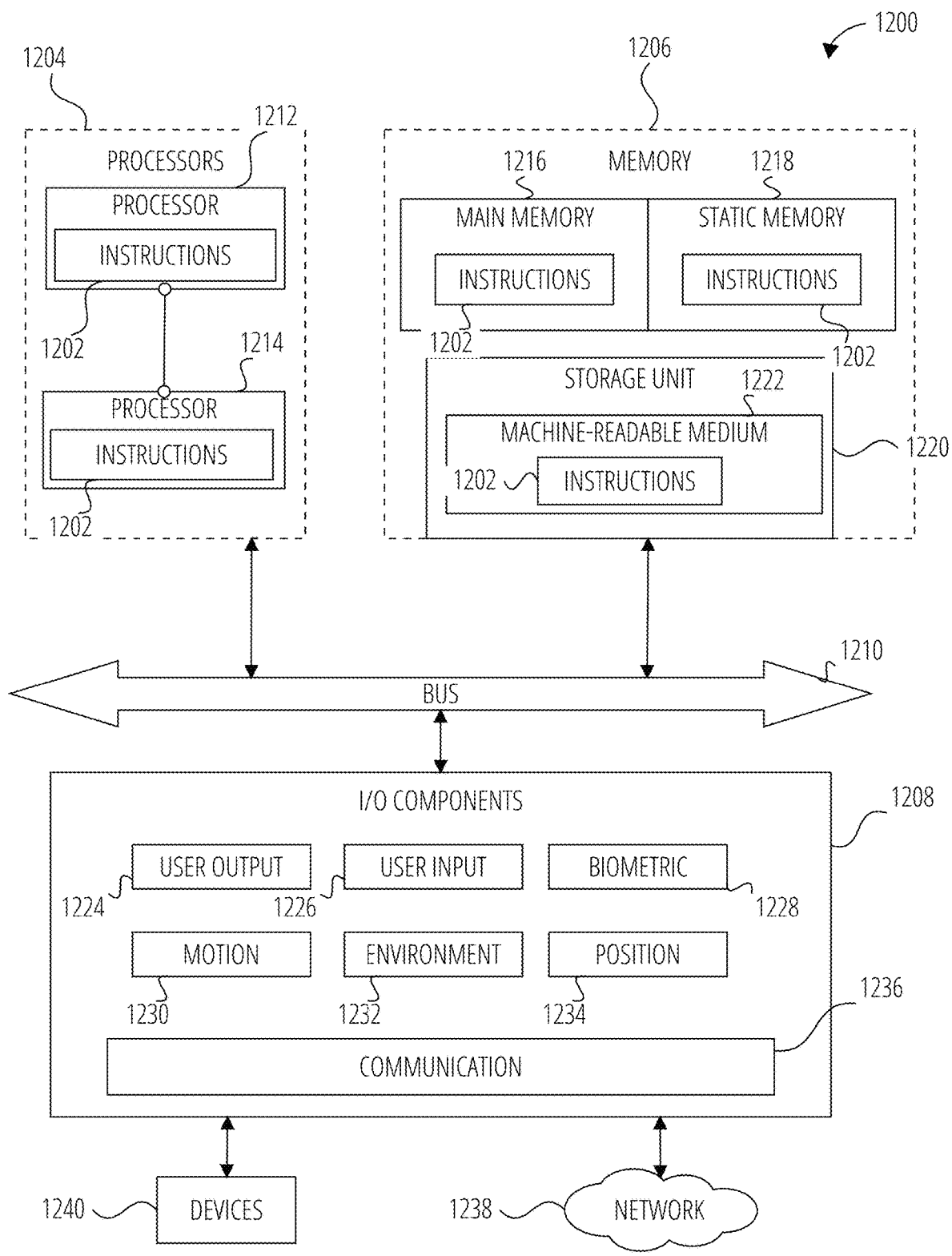
FIG. 12 is a diagrammatic representation of a machine in the form of a computer system within which a set of instructions may be executed to cause the machine to perform any one or more of the methodologies discussed herein, according to some examples.

FIG. 12 is a diagrammatic representation of the machine 1200 within which instructions 1202 (e.g., software, a program, an application, an applet, an app, or other executable code) for causing the machine 1200 to perform any one or more of the methodologies discussed herein may be executed. For example, the instructions 1202 may cause the machine 1200 to execute any one or more of the methods described herein. The instructions 1202 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while a single machine 1200 is illustrated, the term "machine" shall also be taken to include a collection of machines that individually or jointly execute the instructions 1202 to perform any one or more of the methodologies discussed herein. In some examples, the machine 1200 may comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1208, which may be configured to communicate with each other via a bus 1210. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that execute the instructions 1202. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1216, a static memory 1218, and a storage unit 1220, both accessible to the processors 1204 via the bus 1210. The main memory 1206, the static memory 1218, and storage unit 1220 store the instructions 1202 embodying any one or more of the methodologies or functions described herein. The instructions 1202 may also reside, completely or partially, within the main memory 1216, within the static memory 1218, within machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones may include a touch input device or other such input mechanisms, while a headless server machine will likely not include such a touch input device. It will be appreciated that the I/O components 1208 may include many other components that are not shown in FIG. 12. In various examples, the I/O components 1208 may include user output components 1224 and user input components 1226. The user output components 1224 may include visual components (e.g., a display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1208 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

With respect to cameras, the machine 1200 may have a camera system comprising, for example, front cameras on a front surface of the machine 1200 and rear cameras on a rear surface of the machine 1200. The front cameras may, for example, be used to capture still images and video of a user of the machine 1200 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the machine 1200 may also include a 360° camera for capturing 360° photographs and videos.

Further, the camera system of the machine 1200 may include dual rear cameras (e.g., a primary camera as well as a depth-sensing camera), or even triple, quad or penta rear camera configurations on the front and rear sides of the machine 1200. These multiple cameras systems may include a wide camera, an ultra-wide camera, a telephoto camera, a macro camera, and a depth sensor, for example. The system may additionally include infra-red cameras to permit hand gesture tracking, eye position tracking or night vision, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 further include communication components 1236 operable to couple the machine 1200 to a network 1238 or devices 1240 via respective coupling or connections. For example, the communication components 1236 may include a network interface component or another suitable device to interface with the network 1238. In further examples, the communication components 1236 may include wired communication components, wireless communication components, cellular communication components, satellite communication, Near Field Communication (NFC) components, Bluetooth™ components (e.g., Bluetooth™ Low Energy), Wi-Fi™ components, Zigbee, Ant+, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1216, static memory 1218, and memory of the processors 1204) and storage unit 1220 may store one or more sets of instructions and data structures (e.g., software) embodying or used by any one or more of the methodologies or functions described herein. These instructions (e.g., the instructions 1202), when executed by processors 1204, cause various operations to implement the disclosed examples.

The instructions 1202 may be transmitted or received over the network 1238, using a transmission medium, via a network interface device (e.g., a network interface component included in the communication components 1236) and using any one of several well-known transfer protocols (e.g., hypertext transfer protocol (HTTP)). Similarly, the instructions 1202 may be transmitted or received using a transmission medium via a coupling (e.g., a peer-to-peer coupling) to the devices 1240.

Software Architecture

Figure 13:
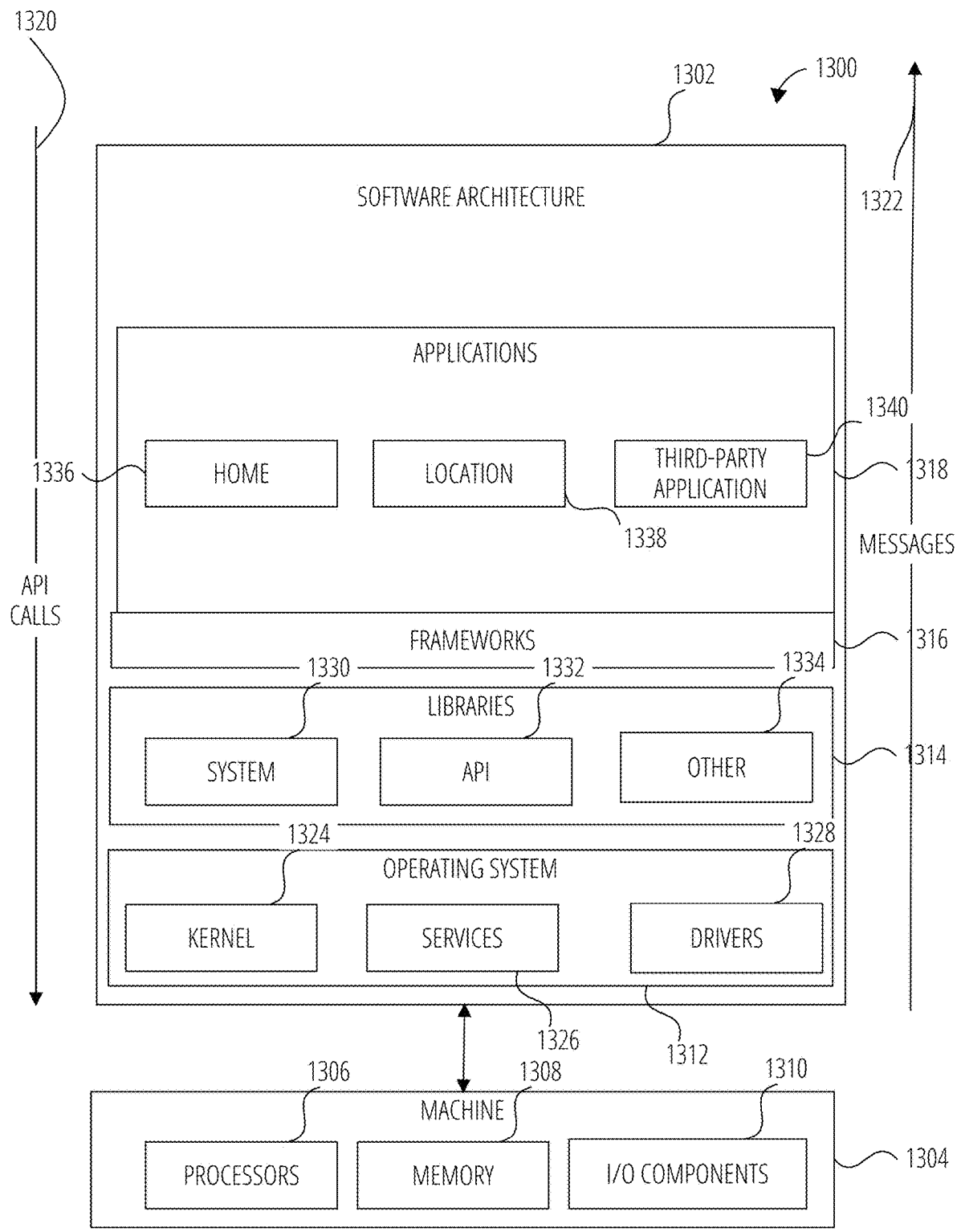
FIG. 13 is a block diagram showing a software architecture within which examples may be implemented.

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematic functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various graphical user interface (GUI) functions, high-level resource management, and high-level location services. The frameworks 1316 can provide a broad spectrum of other APIs that can be used by the applications 1318, some of which may be specific to a particular operating system or platform.

In an example, the applications 1318 may include a home application 1336, a location application 1338, and a broad assortment of other Applications such as a third-party application 1340. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1320 provided by the operating system 1312 to facilitate functionalities described herein.

Figure 14:
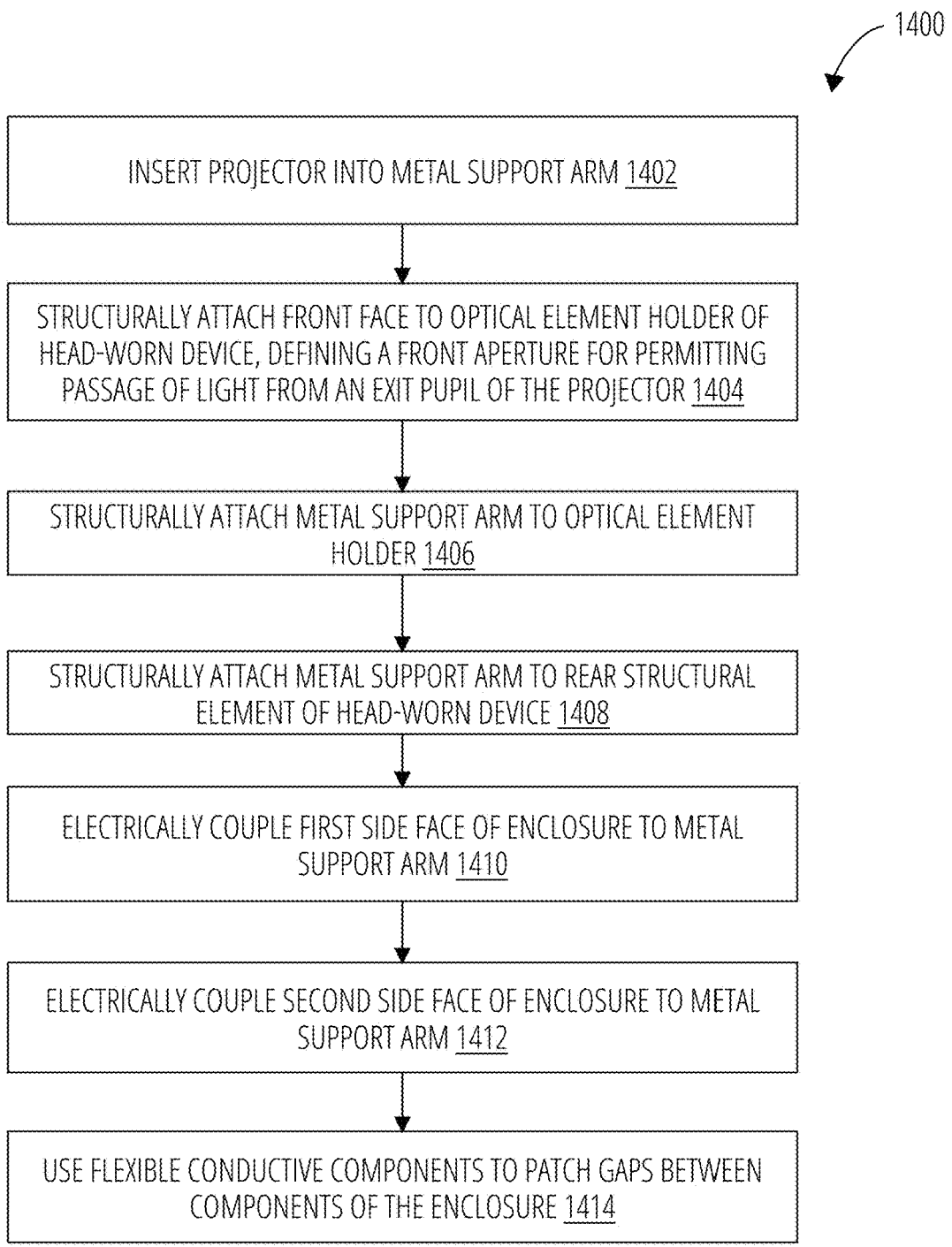
FIG. 14 illustrates a method for assembling a device, in accordance with some examples.

FIG. 14 shows operations of a method 1400 for assembling a device according to examples described herein. Although the example method 1400 depicts a particular sequence of operations, the sequence may be altered without departing from the scope of the present disclosure. For example, some of the operations depicted may be performed in parallel or in a different sequence that does not materially affect the function of the method 1400. In other examples, different components of an example device or system that implements the method 1400 may perform functions at substantially the same time or in a specific sequence.

At operation 1402, the projector 204 is inserted into the metal support arm 302 such that the metal support arm 302 forms a rear face 428, a bottom face 430, and a top face 426 of an enclosure for the projector 204.

At operation 1404, the front face 410 of the enclosure is structurally attached to the optical element holder (e.g., right optical element holder 106) of the head-worn device (e.g., glasses 100), the front face 410 defining a front aperture (e.g., projector front aperture 704) for permitting passage of light from the exit pupil 310 of the projector 204 toward an input optical element 218 of the head-worn device.

At operation 1406, the metal support arm 302 is structurally attached to the optical element holder (e.g., right optical element holder 106) of the head-worn device (e.g., glasses 100).

At operation 1408, the metal support arm 302 is structurally attached to the rear structural element of the head-worn device (e.g., hinge 124).

At operation 1410, the first side face of the enclosure (e.g., left face 404) is electrically coupled to the metal support arm 302.

At operation 1412, the second side face of the enclosure (e.g., right face 304) is electrically coupled to the metal support arm 302.

At operation 1414, flexible conductive components (e.g., conductive foam 418 and/or conductive tape 420) are used to patch gaps between components of the enclosure.

Conclusion

Some examples described herein may attempt to address one or more technical problems in the design of head-worn devices such as XR glasses or other head-worn displays. In some examples, a support arm assembly is provided that forms a grounded projector enclosure to shield the wireless antennas and other RF sensitive components in the device from the projector system. In some examples, the support arm assembly dual purposes other components of the system to also function as parts of the grounded RF-isolating enclosure. In some examples, the support arm assembly may be designed to avoid mechanical loading of the projector system during normal operation, including temple hyperextension.

Example 1 is a device, comprising: a support arm assembly for a head-worn device defining an electrically grounded enclosure for a projector configured to provide radio frequency (RF) shielding for the projector, the support arm assembly comprising: a metal support arm: configured to form a rear face, a bottom face, and a top face of the enclosure; configured to structurally attach to an optical element holder of the head-worn device; and configured to structurally attach to a rear structural element of the head-worn device; a metal front face of the enclosure: configured to structurally attach to the optical element holder; and defining a front aperture for permitting passage of light from an exit pupil of the projector toward an input optical element of the head-worn device, such that the metal support arm forms a structural support joining the optical element holder to the rear structural element without placing mechanical load on the projector; a first side face of the enclosure electrically coupled to the metal support arm; and a second side face of the enclosure electrically coupled to the metal support arm.

In Example 2, the subject matter of Example 1 includes, wherein: the enclosure further comprises a coating of conductive material applied across the exit pupil of the projector, the conductive material being effective to permit passage of at least a portion of the light from the exit pupil and to block at least a portion of RF radiation.

In Example 3, the subject matter of Example 2 includes, wherein: the coating of conductive material comprises indium tin oxide.

In Example 4, the subject matter of Example 3 includes, wherein: the coating of conductive material is effective to block at least a portion of RF radiation having a center frequency below 20 GHz.

In Example 5, the subject matter of Examples 1-4 includes, wherein: the second side face comprises a printed circuit board (PCB) comprising a ground plane, the ground plane being electrically coupled to the metal support arm via one or more ground elements.

In Example 6, the subject matter of Example 5 includes, wherein: the ground plane comprises a plurality of conductive layers electrically joined by via stitching around a perimeter of the ground plane.

In Example 7, the subject matter of Example 6 includes, wherein: the ground plane is configured to pull ground currents towards the PCB of the second side face, such that one or more lossy electrical components of the PCB of the second side face are effective to block high frequency RF ground currents.

In Example 8, the subject matter of Example 7 includes, wherein: the one or more lossy electrical components comprise one or more chokes.

In Example 9, the subject matter of Examples 1-8 includes, wherein: the first side face comprises a sheet metal component electrically coupled to the metal support arm.

In Example 10, the subject matter of Example 9 includes, wherein: the first side face further comprises a printed circuit board (PCB) having a shield can electrically coupled to the sheet metal component and to a board to board (BTB) contact of the projector, thereby electrically grounding one or more components of the projector to the sheet metal component.

In Example 11, the subject matter of Examples 9-10 includes, wherein: the sheet metal component is electrically coupled to the metal support arm via a conductive foam component.

In Example 12, the subject matter of Examples 1-11 includes, wherein: the front face defines at least a portion of a casing for internal components of the projector.

In Example 13, the subject matter of Examples 1-12 includes, wherein: the front face further comprises a metal bracket for mounting a component to the optical element holder, the metal bracket being electrically coupled to the front face.

In Example 14, the subject matter of Examples 1-13 includes, wherein: the optical element holder comprises a conductive material configured to ground the support arm assembly.

In Example 15, the subject matter of Examples 1-14 includes, wherein: the rear structural element comprises a conductive material configured to ground the support arm assembly.

In Example 16, the subject matter of Examples 1-15 includes, wherein: the support arm assembly further comprises one or more flexible conductive components configured to patch gaps between components of the enclosure, each flexible conductive component comprising a conductive tape or a conductive foam.

In Example 17, the subject matter of Examples 1-16 includes, wherein: the rear structural element comprises a hinge.

Example 18 is a method of assembling a head-worn device, comprising: inserting a projector into a metal support arm such that the metal support arm forms a rear face, a bottom face, and a top face of an electrically grounded enclosure for the projector configured to provide radio frequency (RF) shielding for the projector; structurally attaching a front face of the enclosure to an optical element holder of the head-worn device, the front face defining a front aperture for permitting passage of light from an exit pupil of the projector toward an input optical element of the head-worn device; structurally attaching the metal support arm to the optical element holder; and structurally attaching the metal support arm to a rear structural element of the head-worn device, such that the metal support arm forms a structural support joining the optical element holder to the rear structural element without placing mechanical load on the projector.

In Example 19, the subject matter of Example 18 includes, electrically coupling a first side face of the enclosure to the metal support arm; electrically coupling a second side face of the enclosure to the metal support arm; and using one or more flexible conductive components to patch gaps between components of the enclosure, each flexible conductive component comprising a conductive tape or a conductive foam.

Example 20 is a head-worn device, comprising: an optical element comprising an input optical element; an optical element holder configured to hold the optical element; a projector; a rear structural element; and a support arm assembly, comprising an electrically grounded enclosure for a projector configured to provide radio frequency (RF) shielding for the projector, the support arm assembly comprising: a metal support arm: configured to form a rear face, a bottom face, and a top face of the enclosure; configured to structurally attach to the optical element holder; and configured to structurally attach to the rear structural element; a metal front face of the enclosure: configured to structurally attach to the optical element holder; and defining a front aperture for permitting passage of light from an exit pupil of the projector toward an input optical element of the head-worn device, such that the metal support arm forms a structural support joining the optical element holder to the rear structural element without placing mechanical load on the projector; a first side face of the enclosure electrically coupled to the metal support arm; and a second side face of the enclosure electrically coupled to the metal support arm.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Changes and modifications may be made to the disclosed examples without departing from the scope of the present disclosure. These and other changes or modifications are intended to be included within the scope of the present disclosure, as expressed in the following claims.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology. The term "network", as used herein, shall refer to a communication network unless otherwise indicated.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Structural support" refers, for example, to any component or set of components that act to bear mechanical load and thereby act as a mechanical support for other components of a device.

"Structurally attach" refers, for example, to any attachment, coupling, or joint formation with one or more other components such that the structurally attached components jointly form a structural support. A structural attachment between two or more components is intended to bear mechanical load.

"User device" refers, for example, to a device accessed, controlled or owned by a user and with which the user interacts perform an action, or an interaction with other users or computer systems.

What is claimed is:
1. A device, comprising:
a support arm assembly for a head-worn device defining an electrically grounded enclosure for a projector configured to provide radio frequency (RF) shielding for the projector, the support arm assembly comprising:
a metal support arm:
configured to form a rear face, a bottom face, and a top face of the enclosure;

configured to structurally attach to an optical element holder of the head-worn device; and
configured to structurally attach to a rear structural element of the head-worn device;
a metal front face of the enclosure:
configured to structurally attach to the optical element holder; and
defining a front aperture for permitting passage of light from an exit pupil of the projector toward an input optical element of the head-worn device, such that the metal support arm forms a structural support joining the optical element holder to the rear structural element without placing mechanical load on the projector;
a first side face of the enclosure electrically coupled to the metal support arm; and
a second side face of the enclosure electrically coupled to the metal support arm.

2. The device of claim 1, wherein:
the enclosure further comprises a coating of conductive material applied across the exit pupil of the projector, the conductive material being effective to permit passage of at least a portion of the light from the exit pupil and to block at least a portion of RF radiation.

3. The device of claim 2, wherein:
the coating of conductive material comprises indium tin oxide.

4. The device of claim 3, wherein:
the coating of conductive material is effective to block at least a portion of RF radiation having a center frequency below 20 GHz.

5. The device of claim 1, wherein:
the second side face comprises a printed circuit board (PCB) comprising a ground plane, the ground plane being electrically coupled to the metal support arm via one or more ground elements.

6. The device of claim 5, wherein:
the ground plane comprises a plurality of conductive layers electrically joined by via stitching around a perimeter of the ground plane.

7. The device of claim 6, wherein:
the ground plane is configured to pull ground currents towards the PCB of the second side face, such that one or more lossy electrical components of the PCB of the second side face are effective to block high frequency RF ground currents.

8. The device of claim 7, wherein:
the one or more lossy electrical components comprise one or more chokes.

9. The device of claim 1, wherein:
the first side face comprises a sheet metal component electrically coupled to the metal support arm.

10. The device of claim 9, wherein:
the first side face further comprises a printed circuit board (PCB) having a shield can electrically coupled to the sheet metal component and to a board to board (BTB) contact of the projector, thereby electrically grounding one or more components of the projector to the sheet metal component.

11. The device of claim 9, wherein:
the sheet metal component is electrically coupled to the metal support arm via a conductive foam component.

12. The device of claim 1, wherein:
the front face defines at least a portion of a casing for internal components of the projector.

13. The device of claim 1, wherein:
the front face further comprises a metal bracket for mounting a component to the optical element holder, the metal bracket being electrically coupled to the front face.

14. The device of claim 1, wherein:
the optical element holder comprises a conductive material configured to ground the support arm assembly.

15. The device of claim 1, wherein:
the rear structural element comprises a conductive material configured to ground the support arm assembly.

16. The device of claim 1, wherein:
the support arm assembly further comprises one or more flexible conductive components configured to patch gaps between components of the enclosure, each flexible conductive component comprising a conductive tape or a conductive foam.

17. The device of claim 1, wherein:
the rear structural element comprises a hinge.

18. A method of assembling a head-worn device, comprising:
inserting a projector into a metal support arm such that the metal support arm forms a rear face, a bottom face, and a top face of an electrically grounded enclosure for the projector configured to provide radio frequency (RF) shielding for the projector;
structurally attaching a front face of the enclosure to an optical element holder of the head-worn device, the front face defining a front aperture for permitting passage of light from an exit pupil of the projector toward an input optical element of the head-worn device;
structurally attaching the metal support arm to the optical element holder; and
structurally attaching the metal support arm to a rear structural element of the head-worn device,
such that the metal support arm forms a structural support joining the optical element holder to the rear structural element without placing mechanical load on the projector.

19. The method of claim 18, further comprising:
electrically coupling a first side face of the enclosure to the metal support arm;
electrically coupling a second side face of the enclosure to the metal support arm; and
using one or more flexible conductive components to patch gaps between components of the enclosure, each flexible conductive component comprising a conductive tape or a conductive foam.

20. A head-worn device, comprising:
an optical element comprising an input optical element;
an optical element holder configured to hold the optical element;
a projector;
a rear structural element; and
a support arm assembly, comprising an electrically grounded enclosure for a projector configured to provide radio frequency (RF) shielding for the projector, the support arm assembly comprising:
a metal support arm:
configured to form a rear face, a bottom face, and a top face of the enclosure;
configured to structurally attach to the optical element holder; and
configured to structurally attach to the rear structural element;

a metal front face of the enclosure:
  configured to structurally attach to the optical element holder; and
  defining a front aperture for permitting passage of light from an exit pupil of the projector toward an input optical element of the head-worn device,
    such that the metal support arm forms a structural support joining the optical element holder to the rear structural element without placing mechanical load on the projector;
a first side face of the enclosure electrically coupled to the metal support arm; and
a second side face of the enclosure electrically coupled to the metal support arm.

* * * * *